United States Patent [19]
Boggs

[11] 3,776,291
[45] Dec. 4, 1973

[54] TRACK-OVER-TIRE DRIVING ARRANGEMENT

[75] Inventor: Roger L. Boggs, East Peoria, Ill.

[73] Assignee: Caterpillar Tractor Co., Peoria, Ill.

[22] Filed: Apr. 28, 1972

[21] Appl. No.: 248,576

[52] U.S. Cl. .................................. 152/182, 305/19
[51] Int. Cl. ...................... B62d 65/16, B62d 55/08
[58] Field of Search ............... 305/19, 34; 152/182, 152/183, 178, 179, 184, 186, 187, 190, 191

[56] References Cited
UNITED STATES PATENTS

| | | | |
|---|---|---|---|
| 3,612,624 | 10/1971 | Stedman | 305/19 |
| 1,262,011 | 4/1918 | Bruce | 152/182 |
| 1,307,036 | 6/1919 | Bretscher | 152/191 |
| 3,630,580 | 12/1971 | Grawey | 305/19 |

Primary Examiner—Richard J. Johnson
Attorney—Paul S. Lempio

[57] ABSTRACT

The tread of a rubber tire has circumferentially extending continuous grooves and transversely disposed notches formed thereon. A track assembly, comprising a plurality of closely coupled track shoes, circumferentially surrounds the tire and has drive lugs secured thereon which engage the notches. Circumferentially extending flexible belts are secured to the track shoes and engage the grooves.

10 Claims, 3 Drawing Figures

TRACK-OVER-TIRE DRIVING ARRANGEMENT

BACKGROUND OF THE INVENTION

Numerous attempts have been made to surround a pneumatic tire with a protective armor-type device mechanically coupled to the tire to provide a positive drive therebetween. Numerous problems have arisen with respect to such devices, particularly when they are employed on earthworking vehicles which operate over severe underfoot conditions, such as those encountered in rock quarries and like job sites. For example, there is a tendency for the track shoes employed in such devices to either leave the tire or severely damage same.

SUMMARY OF THE INVENTION

This invention overcomes the above, briefly described problems by providing a track-over-tire driving arrangement, comprising a spacer means having an endless track assembly mounted therearound, which exhibits high driving capabilities and fully protects the spacer means. The spacer means, such as a pneumatic rubber tire, has circumferentially extending continuous grooves and transversely disposed notches formed on the periphery thereof. The track assembly comprises a plurality of closely coupled track shoes, each having at least one drive lug formed thereon to engage a respective one of the notches and endless flexible belt means attached to the track shoes to engage each of the grooves.

BRIEF DESCRIPTION OF THE DRAWINGS

Other objects of this invention will become apparent from the following description and accompanying drawings wherein.

DESCRIPTION OF THE PREFERRED EMBODIMENT

Figures 1, 2, 3:
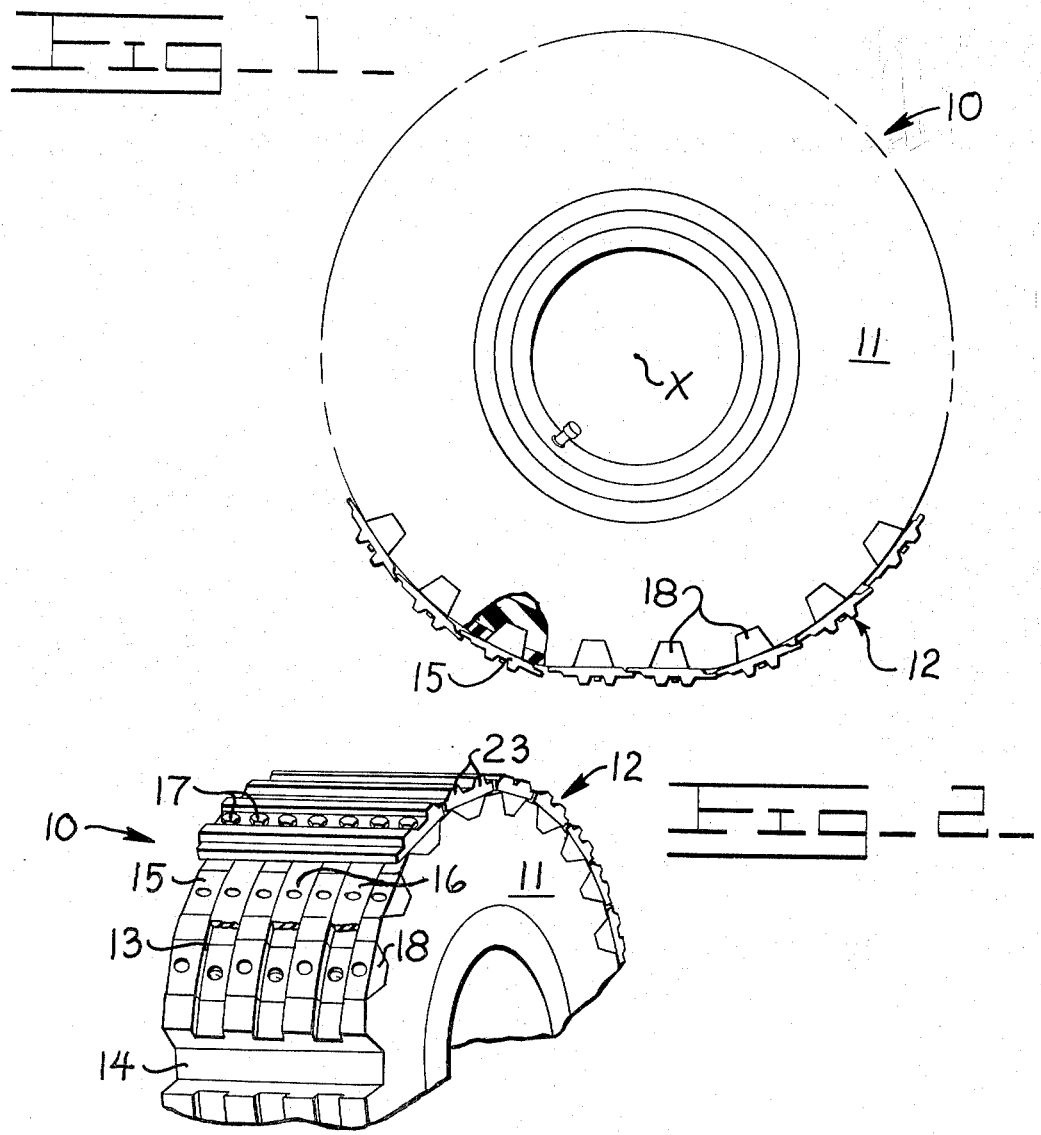
FIG. 1 is a partially sectioned side elevational view of a track-over-tire driving arrangement embodiment of this invention.
FIG. 2 is a partial isometric view of the driving arrangement with some track shoes removed to expose underlying portions.
FIG. 3 is an enlarged and partially sectioned side elevational view illustrating the disposition of three drive lugs as they would appear during operation of the driving arrangement.

Referring to FIGS. 1 and 2, a track-over-tire driving arrangement 10 is adapted to replace a conventional tire or the like employed on standard earthworking equipment, such as a wheel-type tractor. The driving arrangement comprises an annular resilient spacer means 11 having a polygonal-shaped endless track assembly 12 mounted therearound. The spacer means may comprise an air-inflated rubber tire, for example, suitably mounted on a conventional rim assembly. The rim assembly is adapted for attachment to a vehicle's drive axle (not shown) to be driven and rotated about a central axis X thereof in a conventional manner.

The illustrated tire preferably comprises an interliner, body plies and tread plies which are suitably integrated to form a bias-ply, belted bias-ply or radial-ply tire. A plurality of laterally spaced and circumferentially extending continuous grooves 13 are premolded or otherwise suitably formed on the generally transversely flat outer periphery of the tire's tread to extend circumferentially relative to rotational axis X. Although three such grooves are illustrated, it should be understood that two, four or more such grooves may be employed, depending upon the specific drive application in question.

The grooves are intersected by a plurality of circumferentially spaced and transversely disposed notches 14 which extend across the tire's periphery in a direction of axis X. In the illustrated preferred embodiment, the notches extend fully across the periphery of the tire and have a radial depth which is approximately one-half of the radial thickness of the tread section of the tire (FIG. 1). In addition, the radial depths of the notches are substantially greater than the radial depths of the grooves (FIG. 3) and are trapezoidal in shape to have their apexes point radially inwardly towards rotational axis X.

Endless track assembly 12 comprises a plurality of generally flat and closely coupled ground engaging shoes 15 circumferentially surrounding the tire. The shoes are coupled together by means of endless flexible belt means 16 attached to each of the shoes by laterally spaced bolts 17 which also secure a drive lug 18 to each shoe. For example, as shown in FIG. 3, each belt means may comprise steel cables 19 encapsulated by a suitable elastomer, such as rubber, to exhibit the desired flexibility and composite breaking strength (e.g., 231,000 lb.).

Each belt means mates with a respective groove 13 to prevent the track assembly from moving laterally. A groove 20 (FIG. 3) is formed on the inner surface of each shoe in circumferential alignment with each groove 13 to fully accommodate a belt 16 therein. In the preferred embodiment, the circumferential lengths of each lug 18 and accommodating notch 14 are at least one-half of the circumferential length of a respective track shoe.

As further shown in FIG. 3, first and second lugs 21 and 22 are formed integrally at respective ends of each track shoe. The lugs function to completely mask each other during rotation of the drive arrangement to fully protect the tire's periphery. In particular, first lug 21 of one shoe will substantially cover second lug 22 of an adjacent shoe to protect the tire against damage and to prevent dirt infiltration between the tire and track during vehicle operation.

Although in certain applications the outer surface portions of the track shoes may be smooth and uninterrupted, i.e., void of grousers, the majority of earthworking applications normally require at least one grouser 23 for increased traction and related operating desiderata. Track shoe 15, for example, employs two grousers disposed parallel to axis X and extending radially outwardly therefrom. The grousers preferably extend at least substantially fully across the width of the shoe.

FIG. 3 further illustrates three track shoes 15 as they would appear upon rotation of the tire in a direction R. In this example, wherein a belted bias-ply or radial-ply tire substantially provides complete circumferential support by itself, belts 16 are preferably constructed to exhibit a limited amount of circumferential stretch. In fact, glass reinforced rather than steel cable reinforced belts could be used, if so desired. However, the belts should nevertheless remain substantially tight around the tire to prevent the ingress of dirt and the like between the tire and track assembly.

Root support in notches 14a, 14b and 14c is not required for the apexes of drive lugs 18a, 18b and 18c and the rubber lugs, defined between the notches, will tend to move towards each other when the tire flattens out at its footprint. During operation, the clearance provided around each drive lug will compensate for any mismatch which may be occasioned due to the flattening-out of the tire. Beyond this point, the portions of belts 16 between lugs 18a and 18b, and 18b and 18c will buckle slightly to accommodate any additional flattening-out of the tire.

When torque is applied to the tire, a driving force $D_1$ will bear on driving lug 18a, as indicated in FIG. 3. When rubber deflection and ground slippage of its attached shoe increases to a sufficiently high magnitude, driving lug 18b will pick-up the load, as indicated at $D_2$. As the load further increases, additional slippage and deflection occurs and force $D_3$ will be applied to driving lug 18c. The summation of forces $D_1$, $D_2$ and $D_3$ is equal to and opposite to the summation of the ground reaction forces $T_1$, $T_2$ and $T_3$, occurring at grousers 23.

The operation of the above first example, wherein a belted bias-ply or radial-ply tire functions as its own circumferential restraining means, will vary somewhat in applications wherein the track assembly functions as the circumferential restraining means. As a second example, a bias-ply tire, wherein belts 16 are substantially non-stretchable at the footprint of the tire, would function somewhat differently. In such as application, the drive lugs would have less tendency to move toward each other at the footprint of the tire and preferably have their apexes abutting the bottom of notches 14. Vertical loads imposed on the tire would have little, if any, effect on the tightness and maximum band strength afforded by circumferential belts 16.

In a third example, wherein circumferential support is shared by the tire and the track assembly, closer dimensional control thereof would be required. Tension would be transferred from track belts 16 to the tire at the flattened, footprint area. In such an application, the belts should be sufficiently strong to absorb the entire load imposed thereon.

In all of the above examples, the driving force of the integrated system is transferred from the rubber lugs, defined between notches 14, to track shoes 15 and thus to the ground without imposing any appreciable loads on belts 16. The magnitude of the driving force on each shoe will vary depending upon the tractive capability at any given instant. Such capability will be a function of such parameters as the vertical load imposed on the track assembly, soil conditions, grouser design and the precompression of the driving lugs due to distortion of the tire as it flattens out.

What is claimed is:

1. An annular spacer means mounted for rotation about its central axis and having a generally transversely flat outer periphery with means forming a plurality of laterally spaced, circumferentially extending continuous grooves and transversely disposed notches on said periphery, said notches extending across said periphery in the direction of said central axis, and an endless track assembly mounted on said spacer means comprising a plurality of generally flat and closely coupled ground engaging track shoes circumferentially surrounding said spacer means with each track shoe having at least one drive lug secured thereon to extend radially inwardly toward said axis to engage a respective one of said notches and an endless flexible belt means attached to each of said track shoes and extending circumferentially about said spacer means to engage each of said grooves, each of said drive lugs and notches being trapezoidal shaped with the apexes thereof positioned to point radially inwardly toward said central axis.

2. The invention of claim 1 wherein three of said grooves and three flexible belt means are equally spaced intermediate lateral sides of said spacer means.

3. The invention of claim 1 wherein said spacer means comprises an air-inflated, rubber-like tire member.

4. The invention of claim 1 further comprising a lug means formed on each end of each shoe to be substantially parallel with respect to said central axis for continuously and completely overlapping a lug means of an adjacent shoe whereby the entire peripheral portion of said spacer means is completely masked during rotation thereof.

5. The invention of claim 1 wherein at least one grouser is secured to radially outer surface portions of each of said shoes to extend radially outwardly therefrom and away from said central axis.

6. The invention of claim 5 wherein said grouser extends laterally in the direction of said central axis and at least substantially fully across the width of said shoe.

7. The invention of claim 1 wherein said drive lugs each extend laterally fully across the periphery of said spacer means.

8. The invention of claim 1 wherein one of said drive lugs is secured to each of said shoes.

9. The invention of claim 1 wherein each of said lugs and notches has a width extending at least one-half of the circumferential length of a respective one of said shoes.

10. The invention of claim 1 wherein the radial height of each of said drive lugs and notches is approximately one-half of the radial thickness of the tread section of said spacer means.

* * * * *